R. S. HANDY.
PROCESS OF TREATING ORES.
APPLICATION FILED OCT. 28, 1914.
1,185,902.
Patented June 6, 1916.
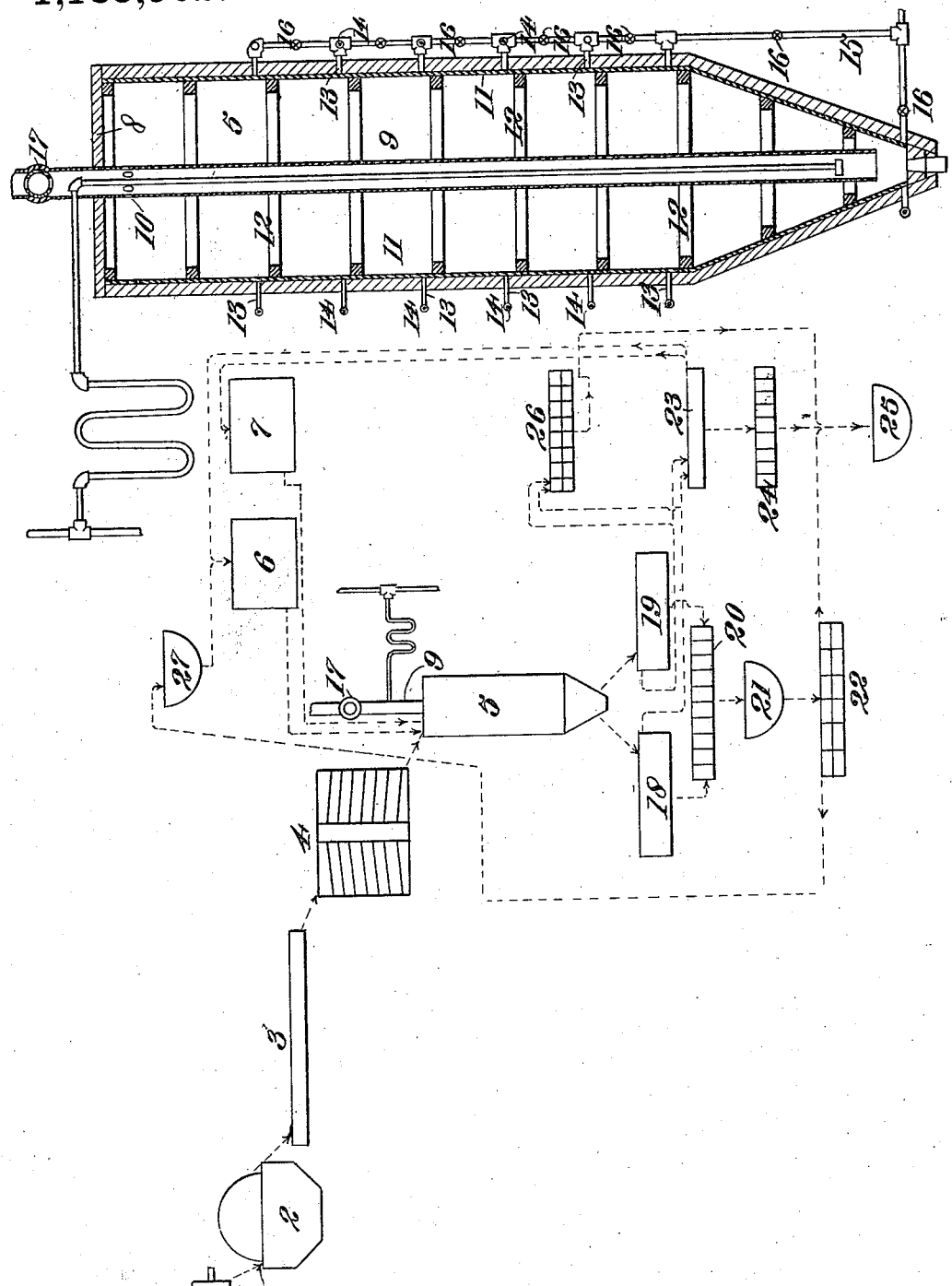
WITNESSES:
Charles Pickles
Thos Castberg
INVENTOR
Royal S. Handy.
BY G. H. Strong
ATTORNEY

UNITED STATES PATENT OFFICE.

ROYAL S. HANDY, OF KELLOGG, IDAHO.

PROCESS OF TREATING ORES.

1,185,902.  Specification of Letters Patent.  Patented June 6, 1916.

Application filed October 28, 1914. Serial No. 868,993.

*To all whom it may concern:*

Be it known that I, ROYAL S. HANDY, a citizen of the United States, residing at Kellogg, in the county of Shoshone and State of Idaho, have invented new and useful Improvements in Processes of Treating Ores, of which the following is a specification.

This invention relates to a process for the extraction of metal values from ores, and pertains especially to a process employing an aqueous solution of a suitable chlorid.

The invention comprehends generally the following steps: The ore to be treated is first ground, either dry, or in the presence of water to a consistency to pass through a twenty mesh screen. The pulp is then filtered, if necessary, to free it of most of its water, the solid residuum from the filtering then being dried ready for roasting. The dry product is then roasted in a manner well known in the art. The roasted material is then subjected to heat, aeration, and agitation in a vessel to which a suitable quantity of aqueous solution of a suitable chlorid such for instance as sodium chlorid or ammonium chlorid or ferrous or ferric chlorid, or any combination of them, has been added. The heated agitated contents are then filtered and the filtrate is cooled and settled. The residue in the filter is then further agitated, aerated and heated with the above chlorids, in any combination desirable, or with wash water, until the metallic contents of the ore in the filter have been sufficiently chlorinated and extracted. The residue is then washed out of the filter to waste.

Lead chlorid in the filtrate crystallizes out to a large extent upon cooling, and the soluble chlorids remaining in the cool solution may be decanted off and used for treatment of fresh ore, leaving the lead chlorid to be collected and treated as desired. When the solution of soluble chlorids becomes burdened with any salt, it may be diverted to precipitating boxes, where the metals may be precipitated by any suitable means, such as circulating the solutions over iron, lead, zinc, copper, or other precipitant, or by electrolysis of the solutions, or by electrolysis of a fused mass of the salt.

In the drawing I have diagrammatically represented an apparatus suitable for practising the invention; the combined heater, aerator and filter being shown in section.

1 represents a suitable means for grinding the ore; 2 a suitable means for filtering, if required; 3 a drier for the filtered residue; 4 a roaster of any appropriate design from which the roasted product is delivered to a filter 5 into which a suitable amount of the chlorids of sodium, ammonium or iron, in any combination, in aqueous solution is admitted from the storage tanks 6 and 7.

The filter 5 preferably consists of a conical bottomed wooden tank with an airtight cover 8 and containing an air lift 9 centrally suspended, reaching nearly to the bottom of the cone, with discharge holes 10 near the top of the tank; the pipe of the air lift extending through the tight cover of the tank far enough to give equilibrium to the mass of pulp within the pipe and allowing the excess of air to escape. The inside periphery of the tank is covered with a suitable filtering medium 11, such as cocoa matting, canvas or asbestos cloth secured by means of circular wooden strips 12 which are suitably fastened to the tank. These wooden strips form compartments, each of which is drained by suitable pipes 13 leading to a surrounding header leading by pipe 15 to a suction pump, not shown. By means of valves 16 the compartments may be consecutively cut off from the suction. As desired, the valve 17 at the head of the air lift pipe may be closed and pressure used for filtering instead of suction. Manifestly any other desirable agitator-filter may be used in this process however.

18 and 19 are suitable wooden tanks for cooling and settling the filtrates. 20 is a filter for washing and drying the lead chlorid which crystallizes out of 18 and 19. 21 is an evaporator for fusing the same and 22 represents electrolytic cells for producing chlorin and lead from the fused lead chlorid. 23 are precipitating boxes for precipitating the metals from the burdened chlorid solutions decanted off from 18 and 19. 24 and 25 is an apparatus for collecting and melting these metals. 26 are electrolytic cells for producing chlorin and zinc from zinc chlorid. 27 is an apparatus for manufacturing ferric chlorid or ferrous chlorid from the action of chlorin or hydrochloric acid upon the iron in ores. I believe it is not necessary to describe these various tanks, precipitating boxes and electrolytic cells in detail, as they are all in current use in the practice of the art.

The apparatus required in the treatment of ores by this process depends upon the metallic contents of the ores, and the strength and amount of solutions required depends upon the quantities of such metallic contents present. An ore containing iron, lead, zinc, silver and copper sulfids would first be roasted to form as much lead sulfate and iron oxid as possible, as follows:

$$PbS+O_3=PbO+SO_2$$
$$SO_2+SiO_2+O=SO_3+SiO_2$$
$$PbO+SO_3=PbSO_4$$
$$FeS+O_3=FeO+SO_2$$
$$2FeO+O=Fe_2O_3$$

The roasted ore would then be treated with sodium chlorid, as follows:

$$PbSO_4+2NaCl=PbCl_2+Na_2SO_4$$

The lead chlorid would crystallize out and the $Na_2SO_4$ would be either discarded or evaporated and treated with coal and lime to form sodium carbonate, as follows:

$$Na_2SO_4+2C=Na_2S+2CO_2$$
$$Na_2S+CaCO_3=Na_2CO_3+CaS$$

The sodium carbonate may be used to precipitate zinc carbonate from zinc chlorid, as follows:

$$ZnCl_2+Na_2CO_3=ZnCO_3+2NaCl$$

Sodium chlorid is thus regenerated for use in treating fresh charges of ore, while the zinc is in a highly marketable form.

The residue from the first filtration is then treated with ferric chlorid (or ferrous chlorid) as follows:

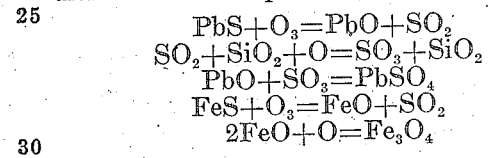

Any ferrous chlorid is immediately oxidized to ferric chlorid by the action of the air, as follows:

$$6FeCl_2+3O=4FeCl_3+Fe_2O_3$$

In the precipitation, the following reactions take place:

$$PbCl_2+Fe=FeCl_2+Pb$$
$$PbCl_2+Zn=ZnCl_2+Pb$$
$$2CuCl+Fe=FeCl_2+2Cu$$
$$AgCl+Cu=CuCl+Ag$$
$$2AgCl+Pb=PbCl_2+2Ag$$
$$FeCl_2+ZnO+H_2O=ZnCl_2+Fe(OH)_2$$

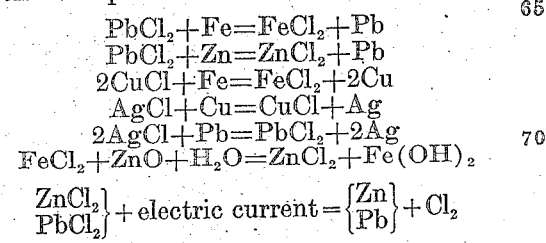

As an alternative method of lead chlorid treatment, the hot, neutral solution of lead chlorid may be circulated over metallic iron, when the lead will be precipitated out as metal, and an equivalent amount of iron will go into solution as ferrous chlorid, which may be oxidized to ferric chlorid and used for further extraction of metals from the ores, as follows:

$$PbCl_2+Fe=FeCl_2+Pb$$
$$6FeCl_2+3O=4FeCl_3+Fe_2O_3$$
$$2FeCl_3+3PbSO_4=3PbCl_2+Fe_2(SO_4)_3$$

Having thus described my invention, what I claim and desire to secure by Letters Patent is—

1. The process of treating sulfid ores containing lead which comprises roasting the ores, extracting the lead sulfate with an aqueous solution of sodium chlorid, extracting other metal constituents with an aqueous solution of iron chlorid, and recovering the lead and other metal constituents from such solutions.

2. The process of treating sulfid ores containing lead which comprises roasting the ore, extracting the lead sulfate with a hot aqueous solution of sodium chlorid while subjecting the ore to agitation and aeration, separating the resulting solution from the ore, extracting the remaining ore with a hot aqueous solution of iron chlorid while subjecting the ore to agitation and aeration, and recovering the metal values from the resulting solutions.

3. The process of treating sulfid ores containing lead, silver and zinc which comprises roasting the ore, extracting the lead sulfate with an aqueous solution of sodium chlorid, then extracting the silver and zinc with an aqueous solution of ferric chlorid, and recovering the metal values from the resulting solutions.

In testimony whereof I have hereunto set my hand in the presence of two subscribing witnesses.

ROYAL S. HANDY.

Witnesses:
 STANLEY A. EASTON,
 W. K. GWIN.